Patented Nov. 23, 1937

2,099,673

UNITED STATES PATENT OFFICE 2,099,673

1-ACYL-AMINO-ANTHRAQUINONE-6-THIAZOLES

Earl Edson Beard, Milwaukee, Wis., assignor to E. I. du Pont de Nemours & Company, Wilmington, Del., a corporation of Delaware No Drawing. Application March 20, 1935, Serial No. 11,964

7 Claims. (Cl. 260—44)

This invention relates to carbon compounds and to processes for their production. More particularly it relates to dye intermediates, dyes and colored compounds derived from 1-nitro-anthraquinone-6-carboxylic acid. It especially contemplates vattable 1-nitro-anthraquinone-6-carboxylic acid derivatives probably having the formula:

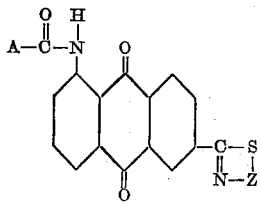

in which A represents a carbon compound radical, residue or nucleus and Z represents a carbon compound radical, residue or nucleus and the production of such compounds from 1-nitro-anthraquinone-6-carboxylic acid derivatives having the probable formula:

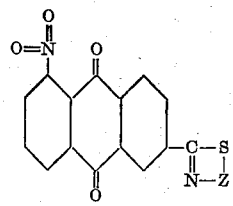

Eckert in 1914 (Monats. fur Chemie 35 289) showed that by nitrating anthraquinone-beta-aldehyde and oxidizing the resultant nitro-anthraquinone-aldehyde that the compound 1-nitro-anthraquinone-6-carboxylic acid is produced.

In my copending application, Ser. No. 729,441, filed June 7, 1934, it is shown that 1-nitro-anthraquinone-6-carboxylic acid can be converted to the corresponding carbonyl halide, for example 1-nitro-anthraquinone-6-carbonyl chloride and that such carbonyl halide can be condensed with carbon compounds containing amino- and mercapto-substituents on adjacent carbon atoms, to produce 1-nitro-anthraquinone-6-thiazoles.

Of these 1-nitro-anthraquinone-6-thiazole compounds the substances in which "Z" represented a cyclic body, particularly those in which the amino- and mercapto substituents were in ortho positions on a benzene residue in the nucleus, merited special mention.

It has now been found that new chemical compounds, new vat dyes, new colored compounds, new vattable compositions of matter and new intermediates may be produced by condensing (or reacting) carboxylic acid halides, especially carbonyl chlorides, with the amines produced by reducing the aforementioned 1-nitro-anthraquinone-6-thiazoles.

This invention has for an object the preparation of new and valuable chemical compounds. Other objects are to produce new dyes, new dye intermediates, new vat color compounds, new color substances, new chemical processes, new derivatives of 1-nitro-anthraquinone-6-carboxylic acid, new derivatives of 1-nitro-anthraquinone-6-thiazoles and new vattable substances. Still further objects are the preparation of carbon compounds in a very desirable physical form and in a high state of purity. A general advance in the art and other objects which will appear hereinafter are also contemplated.

The foregoing objects and related ends are accomplished in the manner set out in the following description in which the details of what is believed to be the best mode for carrying out the invention are disclosed.

Specifically one method for accomplishing the aforementioned objects and attaining the newly discovered products is by treating 1-nitro-anthraquinone-6-thiazoles in such a way as to produce 1-amino-anthraquinone-6-thiazoles and thereafter treating the resultant compounds with carbonyl halides.

The invention will be further understood from a consideration of the following detailed description and specific examples in which the parts are given by weight.

TREATMENT OF 1-NITRO-ANTHRAQUINONE-6-CARBONYL HALIDES WITH ORTHO-AMINO-MERCAPTAN COMPOUNDS

Example

Ten (10) parts of 1-nitro-anthraquinone-6-carbonyl chloride and 8.5 parts of 1-mercapto-2-amino-anthraquinone were heated together in 100 parts of nitrobenzene at 150°–180° C. for 1 to 2 hours. The reaction mass was cooled, filtered at 80° C., washed with nitrobenzene and alcohol and dried. The condensation product produces a red-brown sulfuric acid solution color and a bordeaux alkaline hydrosulfite vat. The same product which in this case is thought to be 5'-nitro-1(S):2:2'-di-anthraquinonyl-thiazole was also produced by carrying out the above procedure upon the sodium salt of the mercaptan as a starting material.

PREPARATION OF 1-AMINO-ANTHRAQUINONE-6-THIAZOLES

Example I

Ten (10) parts of 5'-nitro-1(S):2:2'-di-anthraquinonyl-thiazole having the formula

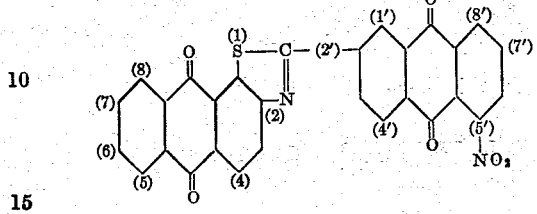

were boiled in 800 parts of water and 50 parts of a 30% sodium sulfhydrate (NaSH) solution for one hour. The nitro group in the compound treated was reduced to an amino group giving the compound 5'-amino-1(S):2:2'-di-anthraquinonyl-thiazole. This product was filtered from the hot suspension, washed with hot water and dried. The yield was substantially theoretical. If desired, the wet filter cake from the preparation of 5'-nitro-1(S):2:2'-di-anthraquinonyl-thiazole may be utilized directly in the above described reduction.

In a similar manner, other 5'-nitro-anthraquinone-2':1:2-thiazoles, for example 5-ethoxy-5'-nitro-anthraquinone-2':1(S):2(N)-thiazole, may be reduced to the corresponding amines.

PREPARATION OF 5'-ACYL-AMINO-ANTHRAQUINONE-2':1:2-THIAZOLES

Example II

Ten (10) parts of 1(S):2:2'di-anthraquinonyl-thiazole-5'-amine were benzoylated by treating the same in 200 parts of nitrobenzene at 150°–160° C. with 5 parts of benzoyl chloride. The resulting product probably has the formula:

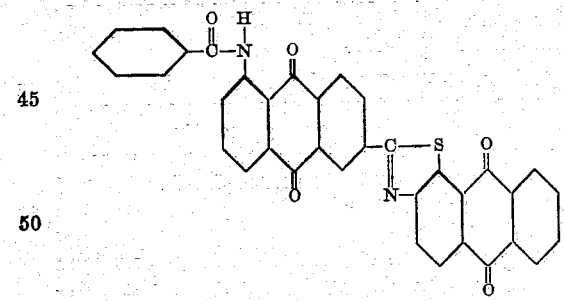

This product is an excellent yellow vat dye. It is suitable for both printing and dyeing, giving brilliant colorations (clear yellow) on cotton. It is a yellow powder which produces a yellow sulfuric acid solution color and a red-violet alkaline hydrosulfite vat color.

Related products are obtained by utilizing substituted benzoyl halides. Special mention may be made of para-nitro-benzoyl chloride, para-nitro-benzoyl bromide, meta-chloro-benzoyl chloride, para-methyl-benzoyl chloride, the isomeric alkoxy (for example, methoxy and ethoxy) benzoyl chlorides, alpha-naphthoyl chloride and beta-naphthoyl chloride.

Example III

Ten (10) parts of 1(S):2:2'-di-anthraquinonyl-thiazole-5'-amine were acylated by treating the same in 200 parts of nitrobenzene at 150°–160° C. with 5.6 parts of anthraquinone-2-carbonyl chloride. This product also is an excellent yellow vat dye, especially desirable for printing. Its sulfuric acid solution and vat are similar to those of the product of Example II.

In the preparation of related compounds, specific mention may be made of 1-chloro-anthraquinone-2-carbonyl chloride, 1-nitro-anthraquinone-2-carbonyl chloride, anthraquinone-1-carboxylic acid chloride, 1-amino-anthraquinone-2-carboxylic acid chloride, 1-methoxy-anthraquinone-4-carbonyl chloride and 1-methyl-anthraquinone-4-carbonyl chloride.

Example IV

Ten (10) parts of 1(S):2:2'-di-anthraquinonyl-thiazole-5'-amine were acylated by treating the same in 200 parts of nitrobenzene at 150°–160° C. with 6.2 parts of 1:9-anthra-iso-thiazole-2-carbonyl chloride. The resulting product probably has the formula:

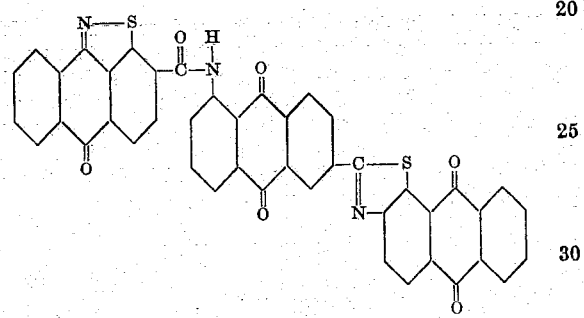

This product is a very good yellow vat dye. It is very attractive for dyeing. Its alkaline hydrosulfite vat is violet and its sulfuric acid solution yellow. The product is an orange-yellow powder.

Related compounds may be prepared using as acylating agents such materials as 1:9-anthra-iso-thiazole-4-carbonyl chloride, 1:9-anthra-iso-thiazole-5-carbonyl chloride, 1:9-anthra-iso-selenazole-2-carbonyl chloride, 1:9-anthra-iso-selenazole-4-carbonyl chloride, 1:9-anthra-iso-selenazole-5-carbonyl chloride, 1:9-anthrathiophene-2-carbonyl chloride, 1:9-anthrathiophene-4-carbonyl chloride, 1:9-anthrathiophene-5-carbonyl chloride, ethylated 1:9-pyrazole-anthrone-2-carbonyl chloride, ethylated 1:9-pyrazole-anthrone-4-carbonyl chloride, ethylated 1:9-pyrazole-anthrone-5-carbonyl chloride, anthraquinone-2:1-phenyl-acridine-4'-carbonyl chloride, anthraquinone-2:1-phenyl-acridone-6-carbonyl chloride, 2:1(S)-anthraquinone-benzthioxanthone-6-carboxylic acid choride, 2:1(N)-anthraquinone-6-carbonyl chloride-beta-beta'-naphthacridone, 2:1(N)-anthraquinone-1':2'(N)-naphthacridone-6'-carboxylic acid chloride, 2:1(S)-anthraquinone-thioxanthone-Bz-4-carboxylic acid chloride, 2:1(S)-anthraquinone-thioxanthone-Bz-2-carboxylic acid chloride, 3:2(S)-thioxanthone-anthraquinone-Bz-2-carboxylic acid chloride, 1:2(S)-anthraquinone-thioxanthone-Bz-2-carbonyl bromide and anthraquinone-1:5-di-carboxylic acid chloride.

Example V

Ten (10) parts of 3-chloro-1(S):2:2'-di-anthraquinonyl-thiazole-5'-amine and 5.2 parts of anthraquinone-2-carbonyl chloride were condensed in 200 parts of nitro-benzene at 150°–175° C., giving a dye having a yellow sulfuric acid solution color.

Example VI

Ten and eight-tenths (10.8) parts of 3-bromo-1(S):2:2'-di-anthraquinonyl-thiazole-5'-amine and 5.2 parts of anthraquinone-2-carbonyl chloride were reacted in 200 parts of nitrobenzene within the temperature range of 150°-175° C., giving a yellow powder which yields a somewhat violet vat.

*Example VII*

Ten (10) parts of 5-ethoxy-phenyl-1(S):2-(N):2'-anthraquinone-thiazole-5'-amine were benzoylated by treatment with 5 parts of benzoyl chloride at 150° C. in 125 parts of nitrobenzene, giving a yellow solid which dissolves in concentrated sulfuric acid to give a yellow color. It gives a brown-violet vat from which cotton is dyed in yellow shades.

*Example VIII*

Ten (10) parts of 5-ethoxy-phenyl-1(S):2-(N):2'-anthraquinone-thiazole-5'-amine and 7.5 parts of 1:9-anthra-iso-thiazole-2-carbonyl chloride were condensed in 125 parts of nitrobenzene at 150° C. The resulting product is a hot dyeing vat color. It gives yellow sulfuric acid solutions and blue-violet vats. It is not quite as fast to soaping as the product of Example IV.

The invention is not limited to the materials specified in the examples. So far as now appears any carbonyl halide may be condensed with the 1-amino-anthraquinone-6-thiazole compounds. Some of the carbonyl halides which merit special mention are, acetyl chloride, acetyl bromide, chloro-acetyl chloride, propionyl bromide, succinyl chloride, oxalyl chloride, benzoyl chloride, toluic acid chloride, ortho-chloro-benzoyl chloride, benzoyl bromide, the anisoyl chlorides, the nitrobenzoyl chlorides, tere-phthaloyl chloride, iso-phthalic acid chloride, alpha-naphthoyl chloride, beta-naphthoyl chloride, beta-anthroquinone-carbonyl chloride, beta-anthraquinone-carbonyl bromide, 1-amino-anthraquinone-2-carbonyl chloride, 1-amino-anthraquinone-6-carbonyl chloride, 1-chloro-anthraquinone-2-carbonyl chloride, 1-chloro-anthraquinone-6-carbonyl chloride, 1:9-anthraisothiazole-2-carbonyl chloride, 1:9-anthraisothiazole-4-carbonyl chloride, 1:9-anthraisothiazole-5-carbonyl chloride, 1:9-anthraisoselenazole-2-carbonyl chloride, 1:9-anthraisothiophene-2-carbonyl chloride, 1-nitro-anthraquinone-2-carbonyl chloride, 1-nitro-anthraquinone-6-carbonyl chloride, anthraquinone-2:1-phenyl-acridone-4'-carbonyl chloride, 1:9-anthra-iso-thiazole-2-carbonyl-amino-1'-anthraquinone-6'-carbonyl chloride, 1:9-anthra-iso-selenazole-2-carbonyl-amino-1'-anthraquinone-6'-carbonyl chloride, anthraquinone-2:1-phenyl-acridone-4'-carbonyl-amino-1''-anthraquinone-6''-carbonyl chloride, benzoyl chloride and derivatives thereof, such as halogen, alkyl or alkoxy, are particularly valuable.

As will be obvious from the above disclosure the symbol "A" in the general formula set out in the first part of the specification may represent any organic radical, residue or nucleus.

In the course of the specification certain formulae have been given for the purpose of aiding and understanding the invention. These formulae have not been proven except by the processes herein described and therefore it is not desired to limit the invention by the same.

As will be clear from the examples, the amount of solvent or suspension agent (if any) used for carrying out the reaction may be varied over a wide range depending largely upon the characteristics of the particular condensation or conversion being carried out and the convenience of the person carrying out the reaction. Particular mention may be made of such solvents or suspension agents as nitrobenzene, chlorobenzenes, (especially tri-chlorobenzene), toluene, xylene, naphthalene, solvent naphtha and the like.

The particular temperatures and time utilized for the various condensations and conversions also depend upon the characteristics of the substances being treated. Temperatures higher than ordinary room or atmospheric temperatures are usually used because of the influence of temperature on the speed of the reaction. High yields and efficiency of the reaction are, to some extent, dependent upon selected temperature ranges which may be readily determined by the person carrying out the reaction. Obviously, temperatures high enough to cause substantial decomposition of the reactants would not be economical.

The solvent, temperature, time and other features of the invention, such as the conversion and condensation, which are most desirable for any particular group of compounds, may be readily determined empirically by one skilled in the art.

Throughout the specification and claims the term "vat color" is used to cover compounds susceptible to vatting by any of the methods known to the art. It includes vat dyes and vattable compounds which are not dyes and vattable compounds which have no (or little) affinity for fiber.

The subject matter of the specification involves an entirely new field of anthraquinone vat colors. The compounds produced have very desirable properties. While the shade of these compounds varies with the particular constitution, it may be stated that in general the colors fall within the range, orange, yellow and brown.

As many apparently widely different embodiments of this invention may be made without departing from the spirit and scope thereof, it is to be understood that I do not limit myself to the specific embodiments thereof except as defined in the appended claims.

I claim:

1. The process which comprises condensing 1-nitro-anthraquinone-6-carbonyl halide with a carbon compound containing amino- and mercapto-substituents on adjacent carbon atoms to produce a thiazole, converting the resultant to the corresponding 1-amino-anthraquinone-6-thiazole compound by treatment with an agent capable of reducing a nitro substituent to an amino substituent and condensing the last mentioned compound with a carbonyl halide.

2. A 1-acyl-amino-anthraquinone-6-thiazole.

3. The process which comprises boiling 10 parts of 5'-nitro-1(S):2:2'-di-anthraquinonyl-thiazole with 800 parts of water and 50 parts of 30% sodium sulfhydrate solution until the nitro group is reduced to an amino group, isolating the resultant amine, and heating with benzoyl chloride in nitrobenzene at 150°–160° C. until benzoylation is complete, the materials being present in the ratio of 200 parts of nitrobenzene and 5 parts of benzoyl chloride for each 10 parts of 1(S):2:2'-di-anthraquinonyl-thiazole-5'-amine.

4. An anthraquinone-6-thiazole having in the 1 position a member of the group consisting of amino and acyl-amino radicals.

5. A 1-amino-anthraquinone-6-thiazole.

6. A 1-benzoyl-amino-anthraquinone-6-thiazole.

7. A 5'-benzoyl-amino-1(S):2:2'-di-anthraquinonyl-thiazole.

EARL EDSON BEARD.